United States Patent
Kemp

(10) Patent No.: US 10,592,861 B2
(45) Date of Patent: Mar. 17, 2020

(54) ACTIVE SHOOTER RESPONSE SYSTEM FOR INITIATING SILENT ALERT AND DEPLOYING TACTICAL TOOLS

(71) Applicant: Elizabeth Kemp, Oconomowoc, WI (US)

(72) Inventor: Elizabeth Kemp, Oconomowoc, WI (US)

( * ) Notice: Subject to any disclaimer, the term of this patent is extended or adjusted under 35 U.S.C. 154(b) by 0 days.

(21) Appl. No.: 16/150,136

(22) Filed: Oct. 2, 2018

(65) Prior Publication Data
US 2019/0180599 A1    Jun. 13, 2019

Related U.S. Application Data

(60) Provisional application No. 62/596,777, filed on Dec. 9, 2017.

(51) Int. Cl.
| | |
|---|---|
| G06Q 10/08 | (2012.01) |
| H04W 4/029 | (2018.01) |
| G08B 25/00 | (2006.01) |
| H04W 4/35 | (2018.01) |
| G08B 13/08 | (2006.01) |
| H04L 29/08 | (2006.01) |

(52) U.S. Cl.
CPC ......... *G06Q 10/087* (2013.01); *G08B 25/002* (2013.01); *H04W 4/029* (2018.02); *H04W 4/35* (2018.02); *G08B 13/08* (2013.01); *H04L 67/12* (2013.01)

(58) Field of Classification Search
CPC .... G08B 25/002; H04W 4/029; G06Q 10/087
USPC ...................................... 340/539.13
See application file for complete search history.

(56) References Cited

U.S. PATENT DOCUMENTS

| | | | |
|---|---|---|---|
| 6,832,251 B1 | 12/2004 | Gelvin et al. | |
| 7,961,088 B2 | 6/2011 | Watts et al. | |
| 8,754,769 B2* | 6/2014 | Stein .................... | A61J 7/0409 |
| | | | 340/540 |
| 8,963,713 B2 | 2/2015 | Dawes et al. | |
| 9,704,000 B2* | 7/2017 | Pleshek .............. | G06K 7/10366 |

* cited by examiner

*Primary Examiner* — John A Tweel, Jr.
(74) *Attorney, Agent, or Firm* — Donald J. Ersler

(57) ABSTRACT

The invention is comprised of physical container units coupled with a fault-tolerant sensor system and one or more servers which receive sensed input and invoke functions within virtual processing components (objects) to perform silent monitoring and critical inventory tracking functions, and which send silent alerts during an active shooting incident to comply with protocols established by the Department of Homeland Security.

14 Claims, 3 Drawing Sheets

ACTIVE SHOOTER RESPONSE SYSTEM FOR INITIATING SILENT ALERT AND DEPLOYING TACTICAL TOOLS

CROSS-REFERENCE TO RELATED APPLICATIONS

This patent application claims the benefit of U.S. Provisional Application No. 62/596,777 filed Dec. 9, 2017. The above application is incorporated by reference.

FIELD OF INVENTION

The present invention relates to the field of alarm systems, and more specifically to the field of alarm systems in which the location of the alarm condition is signaled to a central station, e.g. fire or police telegraphic systems.

BACKGROUND OF THE INVENTION

According to FBI statistics, at least seventy percent of incidents involving an active shooter, defined as one or more individuals actively engaged in killing or attempting to kill people in a populated area, took place in either a commerce or educational environment. In a study of 60 active shooter incidents, the FBI determined that 45.6 percent occurred on business premises, 24.4 percent occurred in educational environments, and 10 percent on government properties.

Businesses are increasingly seeking to insure themselves from lawsuits arising from harm caused by attacks using deadly weapons. Liability may arise or coverage may be denied for failure to implement "reasonable" active shooter policies and protocols, and to ensure they may be implemented.

The Department of Homeland Security (DHS) has identified key protocols for businesses and schools to communicate to students and employees. These protocols may be referenced in determining reasonable actions that businesses, schools and governments must undertake to avoid liability arising from active shooter incidents.

The DHS has concluded that specific actions increase the probability of survival. DHS protocols require silencing of all electronic devices and using technology to communicate with police silently. In the event, that a victim is shot, DHS protocols direct the victim to apply pressure to wounded areas using available supplies. DHS also recommends that doors and windows be locked or blocked, when possible, to prevent an active shooter from entering or seeing into a room.

It is a problem known in the art that many facilities do not have silent alert systems in place to comply with DHS protocols. In facilities that have a silent alert system, victims may not know where the system is located or how to activate it. Tending to wounded individuals may be a competing priority. Critical items to control bleeding or block doors may not be available during an incident. Most importantly, it is often not possible to communicate the location of an active shooting incident while it is occurring, particularly when a shooter rapidly moves from one location to another or to know the originating location of the event to send help.

There is an unmet need for an emergency response system which can increase odds of survival during an active shooter incident by ensuring that communications, medical and tactical equipment necessary to comply with DHS services is fully functional and available at the site of the crisis.

SUMMARY OF THE INVENTION

The present invention is a highly fault-tolerant communication system for transmitting silent alerts and for continuously monitoring the availability of critical tactical and medical items during an active shooting incident, consistent with response protocols established by the Department of Homeland Security.

In various embodiments, the invention is comprised of hardware and virtual processing components for silent communication, and a fault-tolerant sensor system and processing components for continuously tracking the status of critical tactical and medical inventory items to assure availability during an active shooting incident. The invention is comprised of a plurality of Emergency Medical Passive Active Countermeasure Toolkit (EMPACT) container units coupled with sensors, at least one server for receiving sensed input, instantiating virtual objects and updating physical status attributes of EMPACT containers and critical inventory components. Each EMPACT container is associated with a unique identification number. In various embodiments, virtual processing components may include but are not limited to container classes, event classes, mapping classes for displaying locations and status of all containers, personnel tracking classes, and inventory tracking classes which include processing components for continuously verifying placement and usage of items by comparing the current date to an item expiration date.

TERMS OF ART

As used herein, the term "association" means a relationship which correlates one or more data values or one or more data sets for access by computations.

As used herein, the term "attribute" means a variable with which a value is associated; attributes may be static or dynamic.

As used herein, the term "class" means a virtual processing component from which other objects and/or virtual processing components are instantiated; objects and/or virtual processing components within a class may have common attributes and functions.

As used herein, the term "invoke" means to initiate an operation which causes a physical change such as calling a function or retrieving a value.

As used herein, the term "instantiating" or "instantiation" means the creation of an instance of an abstraction or template such as a class, objects, file, function, model or any other data structure or process; the process of instantiation may include defining one particular variation of an object within a class, giving it a name, and locating it in a physical place.

As used herein, the term "tactical" means objects that are used for defense and medical treatment.

As used herein, the terms "virtual processing component" or "object" refers to software which performs a computational process and functions identically to the circuitry of a physical processor.

DETAILED DESCRIPTION OF THE INVENTION

The present invention is a highly fault-tolerant communication system for transmitting silent alerts and for continuously monitoring the availability of critical tactical and medical items for use during an active shooting incident, consistent with response protocols established by the Department of Homeland Security.

Figure 1:
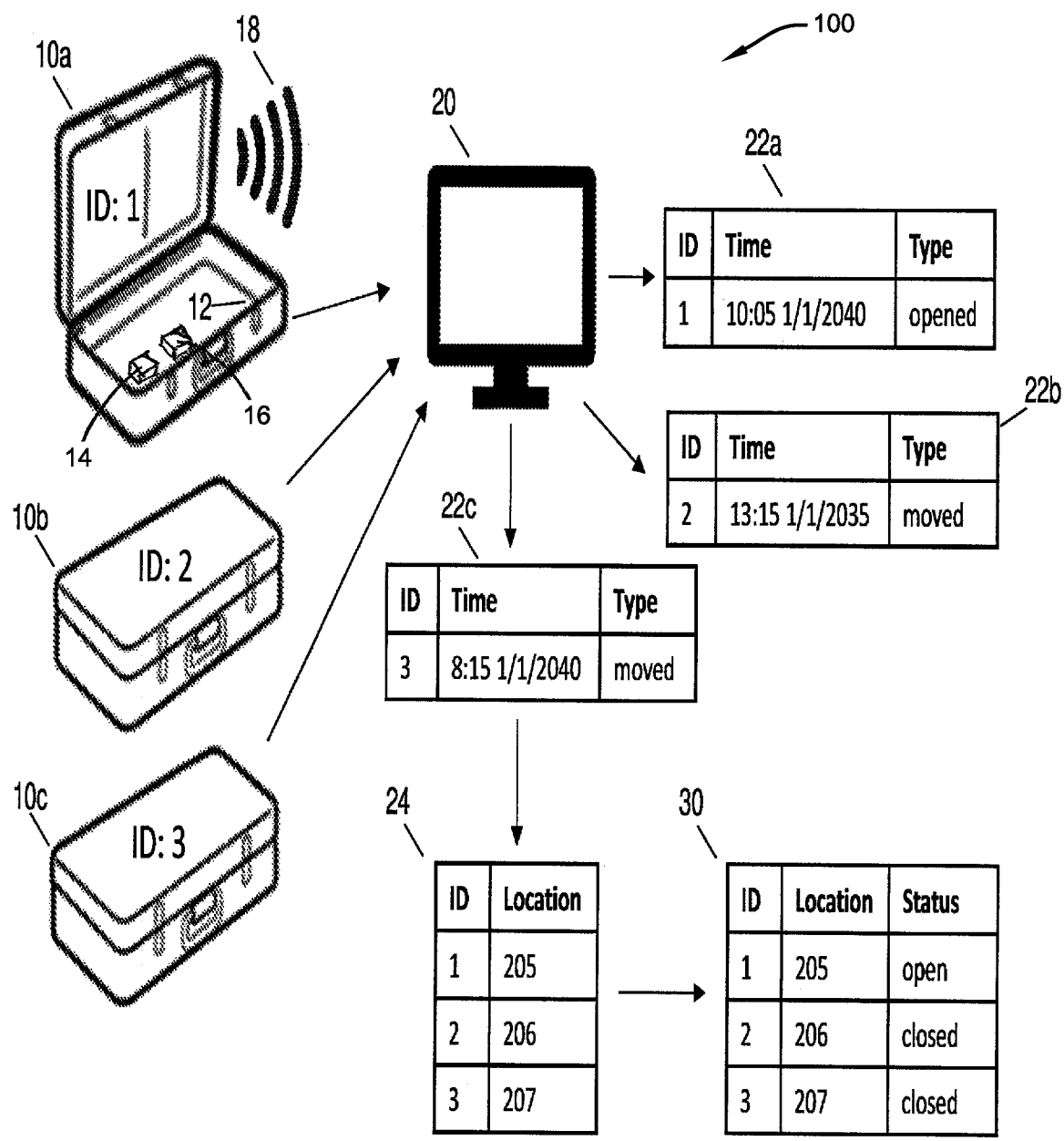
FIG. 1 illustrates an exemplary active shooter response system for initiating a silent alert and deploying tactical tools during an active shooter incident.

FIG. 1 illustrates exemplary active shooter response system 100 for initiating a silent alert and deploying tactical tools during an active shooter incident.

FIG. 1 illustrates containers 10, 10b, and 10c in communication with server 20, which updates display interface 30.

In the exemplary embodiment shown, container 10 is coupled with sensor assembly 12. Container 10 has a unique identification number. Sensor assembly 12 includes access sensor 14 and location sensor 16.

In the exemplary embodiment shown, server 20 is configured with a mapping class which updates map object 24 and an event class to store data related to sensed input, representing events to be logged.

Container 10 is operatively coupled with sensor assembly 12, which transmits signal 18 to server 20 when container 10 is opened or moved. Upon receiving signal 18, server 20 determines the identification number of container 10, the event type, the timestamp, and instantiates event object 22 to store the information. Server 20 also invokes an update function to update mapping object 24 and display interface 30. In various embodiments, display interface 30 shows usage and deployment events associated with each container's location parameters.

In various embodiments, sensor assembly 12 includes a location sensor, a camera, a timer, and a transmitter. In various embodiments, the location sensor is comprised of two components configured to send a location update signal when a sensor mounted on a container can no longer be tracked by a sensor which monitors its presence. In various embodiments, containers may include additional sensors to monitor humidity and/or temperature. In various embodiments, container 10 may require a unique code, badge, finger print or eye scan to open.

Server 20 is a computer system that maintains a data base of containers and identification numbers, and which instantiates virtual processing components called container objects, representing each EMPACT container 10 having a unique identification number. The attributes associated with container objects include, but are not limited to, container identification number, date deployed, container location, container battery level or status, and open/closed status of container. A container object is associated with event objects, inventory objects and mapping objects.

Event objects 22a through 22c correspond to a signal sent by sensor assembly 12. The attributes associated with event objects include, but are not limited to, container identification number, date opened and event type. Event types include alert events and inventory events.

Inventory objects have attributes representing an item stored within container 10. The attributes associated with inventory objects include, but are not limited to, container identification number, item description, quantity, inventory number, date deployed, and expiration date.

Mapping object 24 reflects the status and location of each remote container 10a through 10c at a specific point in time. The attributes associated with mapping objects include, but are not limited to, container identification number, container location, and container status. In various embodiments, mapping object 24 is a picture of a map representing the location of each container 10a through 10c.

Figure 2:
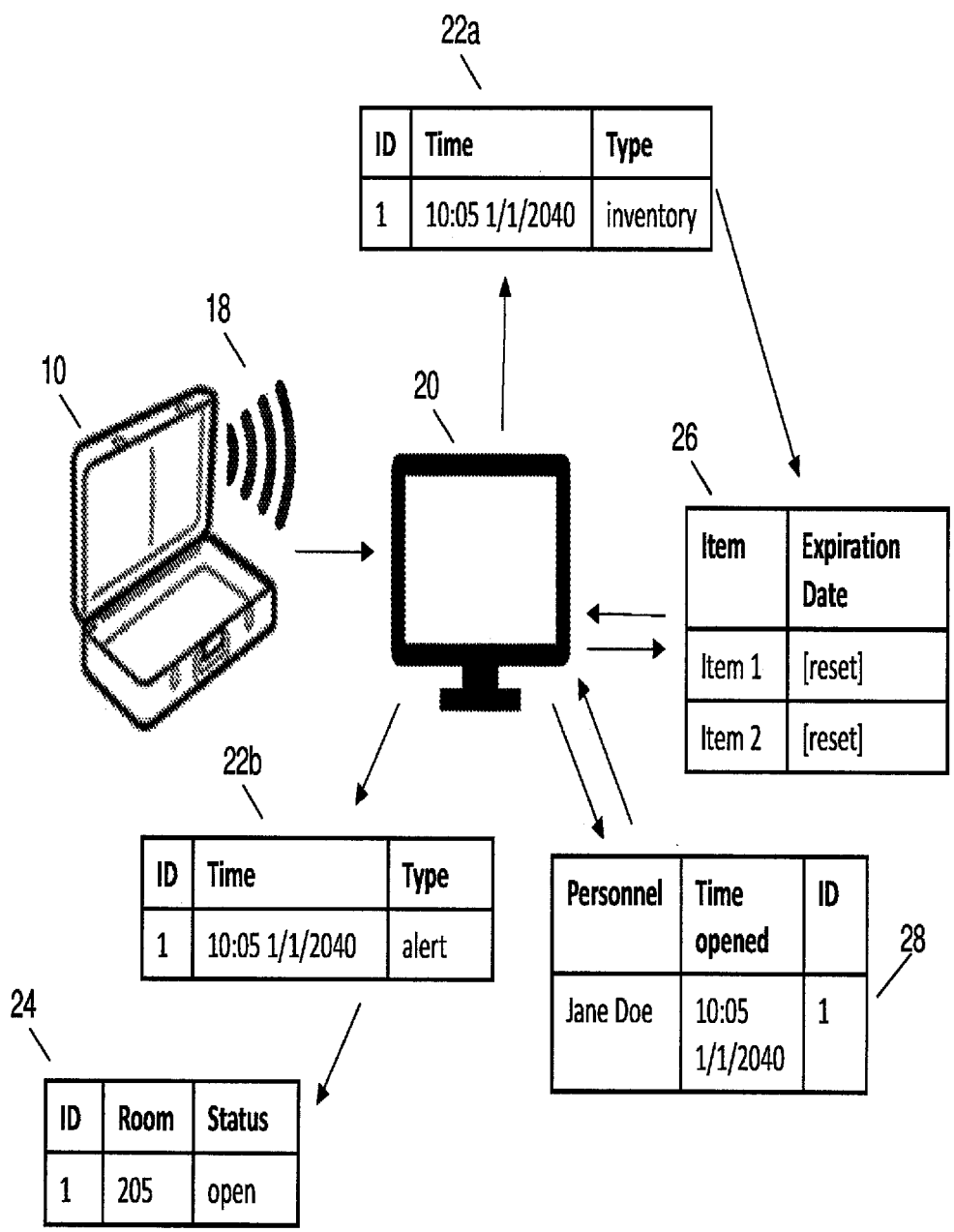
FIG. 2 illustrates virtual processing components for an exemplary active shooter response system.

FIG. 2 illustrates virtual processing components for an exemplary active shooter response system.

In the exemplary embodiment shown, System 100 includes an event class, a mapping class, a container class, an inventory class, and a personnel class.

Server 20 receives signal 18 from container 10 and instantiates an event object. In one embodiment, the event object is inventory event object 22a, which reflects a maintenance event that inspects and/or replaces items in container 10. Inventory event object 22a updates expiration dates and other attributes in inventory object 26.

In an alternative embodiment, the event object is alert event object 22b, which reflects an active shooter incident or another event that requires the use of the medical and tactical items in container 10, or theft of container 10. Alert event object 22b updates locations, statuses, and other attributes in mapping object 24.

The inventory class creates inventory object 26 associated with each container 10.

A processor configured to compare the current date to expiration dates in inventory object 26 can also alert server 20 if an inventory item expires.

Personnel object 28 can send a signal to server 20 to update inventory object 26 or event objects 22a and 22b.

In the exemplary embodiment shown, System 100 is fault tolerant. If any of the sensors fail or do not transmit a signal to server 20, System 100 will alert the user that the location or status of container 10 is unknown.

In various embodiments, System 100 will alert a third party that the status or location of container 10 is unknown. Third parties can include, but are not limited to, emergency reporting centers, police stations, and fire stations.

As illustrated in FIG. 2, server 20 is configured to received sensed inputs and includes a container class, an inventory class, an event class, a mapping class, a personnel class, and a processing component for comparing the current date to the expiration date of an item within remote container 10.

In the exemplary embodiment shown, remote container 10 has a unique identification number and contains items used for mitigating trauma and for enacting defensive countermeasures.

In the exemplary embodiment shown, server 20 is a computer system that maintains a data base of containers and identification numbers. Server 20 instantiates software record objects to represent and track the status and attributes of containers 10, and usage and deployment events associated with each container's location parameters.

The container class is a processing component configured to instantiate container object 27 associated with unique identification numbers. The container objects include the following attributes: container identification number, date deployed, container status, content list code, item data, item status, and date item stored. The server updates the container status when it receives a signal from the sensor assembly.

The inventory class is a processing component configured to instantiate inventory object 26. The inventory objects have attributes representing an item stored within the remote container. Item objects include the following attributes: container identification number, item description, quantity, inventory number, date deployed, and expiration date.

The event class is a processing component configured to instantiate event object 22, corresponding to a signal received from sensor assembly 12. The event objects include the following attributes: container identification number, date opened and event type.

The mapping class is a processing component configured to instantiate quasi-unique mapping object 24, which reflects the status attribute of each remote container 10 at a specific point in time. The mapping objects include the following attributes: container identification number, container location, and container status.

The personnel class is a processing component configured to instantiate personnel object 28 for each authorized personnel. The personnel objects include the following attributes: personnel identification, container identification number, date opened, and authorization status.

In various embodiments, System 100 secures the availability of data relevant to trauma compliance and mitigation efforts. System 100 monitors continuing effectiveness of risk mitigation protocols and further deters interference with risk mitigation protocols.

In the exemplary embodiment shown, when the sensor assembly sends a signal to server 20, server 20 updates (1) the event status, type, and the date and time of the event in event object 22, (2) the container status in container object 24 to reflect that the container has been opened or moved, (3) the expiration dates in inventory object 26, and (4) personnel object 28 to reflect which personnel opened the container, the ID number of the container, and the timestamp of the opening event.

In various embodiments, if container 10 is opened or moved, server 20 may delete the expiration dates in inventory object 26 or may require authorized personnel to validate the existing dates.

Figure 3:
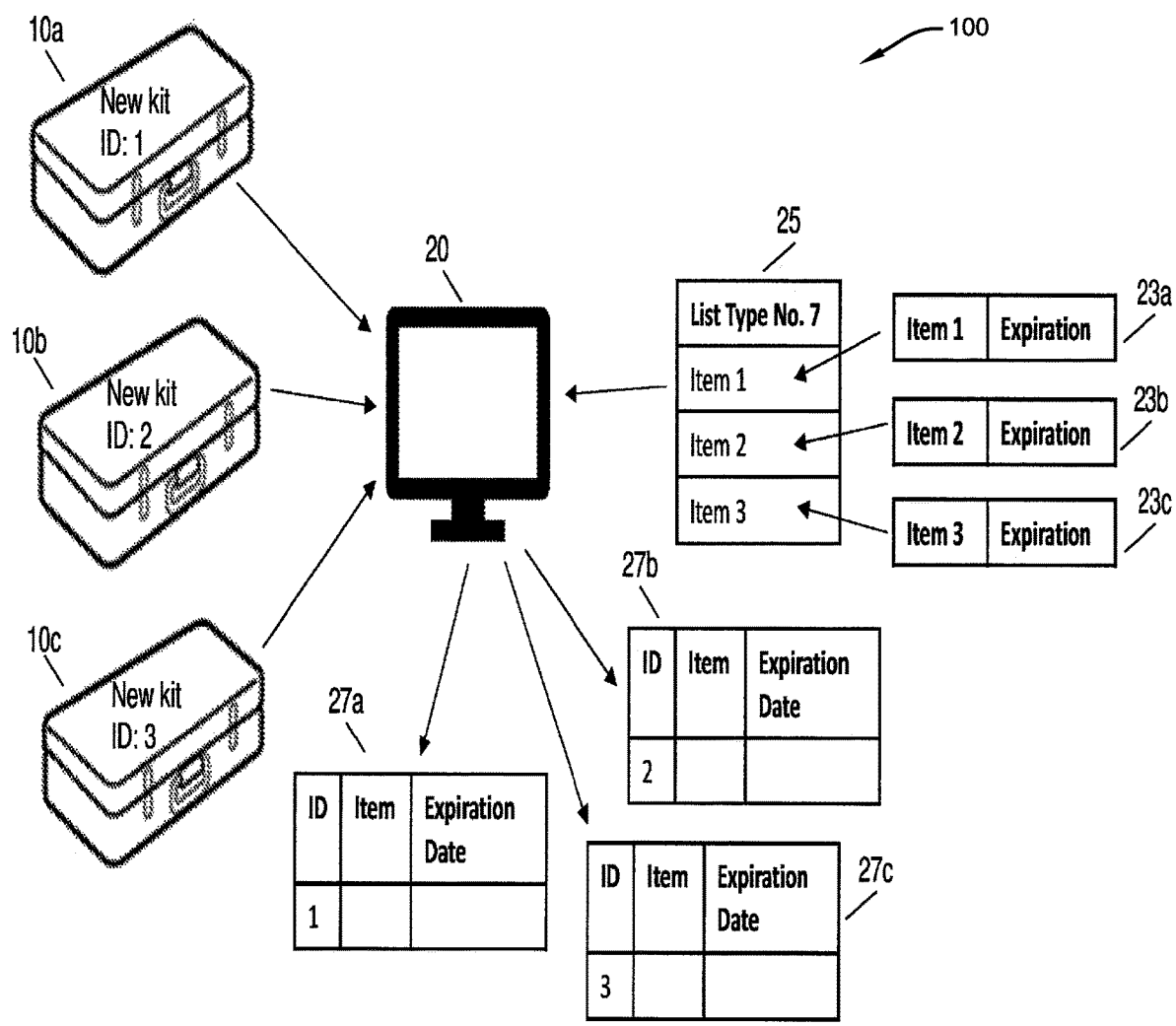
FIG. 3 illustrates the instantiation of a virtual processing component to track an EMPACT container.

FIG. 3 illustrates the instantiation of a virtual processing component to track EMPACT container 10.

To instantiate container object 27 for a new container 10, item objects 23a through 23c are incorporated into inventory list object 25, which are incorporated into container objects 27a through 27c.

In various embodiments, containers 10a through 10c contain trauma response inventory and tactical tools to bridge the gap until professional help can arrive to save lives during an active shooter or trauma event. The trauma response inventory may include supplies to seal wounds and prevent blood loss, without requiring the user to have significant medical training. The tactical tools may include tools to barricade doors to slow the entry of a shooter or improvised weapons.

In various embodiments, remote container 10 is an IP53-certified large portable and lightweight tactical response hard Case container (color orange, red, black or by custom color request) with a proprietary gasket sealing system locks out dirt and moisture.

In various embodiments, container 10 is sealed by a plastic tamper-evident numbered security tear away seals with eight-digit sequential numbering and logo.

In various embodiments, container 10 may contain one or more of the following items: Unique Device Identifier (UDI) tracking bar code label and sticker for bag contents, UPC tracking/audit tag for reorder and content product expiration of EMPACT© bags with UDI, EMPACT© Medical Information Instructional Guide Cards, TAC-WEDGE® PLUS injection mold with saw-tooth wedge blade, hardened steel spikes, hinge lock cut-outs and para-cord handles/Information reference guide, TAC-KEYS© tapered steel keys with opposing saw tooth incisions inserted and twisted between door and jamb to impede unwanted access (three sets of three Tac-Keys with para-cord lanyard, and fabric carry case), Tri-fold disposable cuff with three position diamond fold oversized loops/restraint with Tri-ring pull—compact storage device with wide straps and covered locking mechanism for rapid application of cuff, Bat-like design high powered LED tactical light with 1000 Lumens of intense white light. Anodized aircraft aluminum, water and impact resistant, High Powered 600 LUX LED flashlight, anodized aircraft-grade aluminum, water and impact resistant, tactical edge, dual direction belt/pocket clip, magnetic base, glow-in-the-dark ON/OFF button with Soft Touch Technology (1 AA battery included), Military grade 550 paracord/rope (orange), 7 strand, 50 foot wrapped hank-type III with large "D" clip metal connector minimum rated 2 kN (>550 pounds), Heavy duty oversized, waterproof and windproof, 90% heat reflective, multiuse emergency blanket, olive, 2.5 mil (thick fold), multipurpose tool and knives, Aqua marine emergency whistle (waterproof and durable pea-less design for all-weather use with quick access clip), Coreless roll of Duct Tape—2"×59" (strong and sturdy rubber adhesive, water resistant and easy to tear), Roll bandage self-adherent (3"×4.5 yards) (latex free and bright colored), Small portable, lightweight and water resistant tactical response bag (dark color) with tamper proof seal, re-sealable and disposable for bio-waste containment or used as occlusive dressing, product information and instructions, kit contents and bleeding control guide printed on packaging. 9.5"H×6"W×2"D, Unique Device Identifier (UDI) tracking sticker for bag contents, EMPACT© Medical Information Instructional Guide Sheet, WoundClot® hemostatic trauma bandage (3.1"×39") Z-FOLD, soft sterile knitted fabric made from oxidized regenerated cellulose that transforms into a gel state when exposed to fluids. Capable of absorbing 2500% of its weight in fluids while remaining stable on the wound to manage severely bleeding wounds and traumatic injuries. Strong membrane that adheres to the wound using polymeric chains upon interaction with fluids. Light compression dressing removed by flushing with water or saline, C-A-T Tourniquet with hook and loop windlass retention strap with free-moving and locking internal circumferential pressure band system/orange, SWAT T Tourniquet, Sterile Surgical Gauze, pair (4"×4") latex free, Roll gauze, compressed (4"×4 yards) latex free, Roll bandage self-adherent (4"×4.5 yards), latex free and bright colored, Sterile gauze bandage impregnated with white petrolatum (non-toxic, non-irritating and non-adherent), BZK antiseptic Towelettes (5"×7"), Latex Free gloves/pair large/Sterile, Tape roll (1"×10 yards) hypo allergenic, transparent and latex free, Industrial permanent marker, fine point tip (Black). Permanent ink on most hard-to-mark surfaces, even in extreme heat and steam. Ink is water-resistant and smear proof, Small clear plastic bag with double zipper opening top, Unique Device Identifier (UDI) tracking sticker for bag contents, Latex Free gloves/pair large/Sterile, Nasopharyngeal Airway (NPA) 28 French with Lube—flared end to prevent losing the airway, latex free, Sterile Surgical Gauze, pair (4"×4") latex free, Chemiluminescent Light 4" (4 hours green), phthalate-free, nonflammable, maintenance-free, non-toxic, waterproof and individually wrapped for light/moisture protection, 50 ML—OTC non-alcohol foaming hand sanitizer, Trauma scissors/shears, BZK antiseptic Towelettes (5"×7"), WoundClot® hemostatic trauma bandage (2"×2"), soft sterile knitted fabric made from oxidized regenerated cellulose, and WoundClot® hemostatic trauma bandage (3"×8"), soft sterile knitted fabric made from oxidized regenerated cellulose.

In various embodiments, a TAC-KEY is a precision cut stainless steel device with a wedge-shaped door gap insertion component, door jamb corner, sawtooth teeth, etched line, non-slip grip, lanyard, and cord crimper. The TAC-KEY can prevent a door from opening when applied to the side of the door toward which the door swings when opened.

A user would insert a TAC-KEY wedge-shaped door gap insertion tip-first into the space between a door and its door jamb, on the vertical side of the door that does not have hinges. When the etched line lines up approximately with the door edge, then the user rotates door jamb corner up to 90 degrees toward the door jamb. Non-slip grip indicates the portion of a TAC-KEY that contains door jamb corner and facilitates the correct rotation of a TAC-KEY. After a TAC-KEY is engaged, the shape of wedge-shaped door gap insertion and sawtooth teeth help to prevent the door from opening.

In various embodiments, the lanyard is made of 550 seven strand, military grade paracord. In various embodiments, a single carabiner passes through lanyard of multiple copies of TAC-KEY in a kit to facilitate moving all copies toward a door simultaneously.

In various embodiments, a TAC-WEDGE includes sawtooth wedge blade, hardened steel spikes, hinge lock cutouts, reflective sticker, and para-cord handles.

In various embodiments, a TAC-WEDGE prevents a door from opening.

In various embodiments, a TAC-WEDGE is injection molded.

What is claimed is:

1. A tactical countermeasure response system, comprised of:
    a remote container coupled with at least one sensor assembly in communication with a server, wherein said server is configured with the following virtual processing components:
    a container class for instantiating objects representing containers having unique identification numbers and locations;
    an inventory class for instantiating objects representing inventory items;
    an event class for instantiating objects pertaining to events;
    a mapping class for creating a user interface which continuously displays and
    updates the status and location of said container class, said inventory class and said event class; and
    a processing component for comparing the current date to an item expiration date.

2. The system of claim 1, which further includes a personnel class for instantiating personnel objects representing authorized personnel.

3. The system of claim 2, wherein each of said personnel objects includes attributes selected from the group consisting of personnel identification, container identification number, date opened, and authorization status.

4. The system of claim 1, wherein said container class is a processing component configured to instantiate container objects representing each of said remote containers associated with unique identification numbers.

5. The system of claim 4, wherein each of said container objects includes attributes selected from the group consisting of container identification number, date deployed, container status, content list code, item data, item status, and date item stored.

6. The system of claim 1, wherein said inventory class is a processing component configured to instantiate inventory objects, wherein each of said inventory objects has attributes representing an item stored within said remote container.

7. The system of claim 6, wherein each of said inventory objects includes attributes selected from the group consisting of container identification number, item description, quantity, inventory number, date deployed, and expiration date.

8. The system of claim 1, wherein said event object is a processing component configured to instantiate event objects, corresponding to a signal received from said sensor assembly of said remote container.

9. The system of claim 8, wherein each of said event objects includes attributes selected from the group consisting of container identification number, date opened and event type.

10. The system of claim 1, wherein said mapping class is a processing component configured to instantiate a quasi-unique mapping object, which reflects the status attribute of each of said remote containers at a specific point in time.

11. The system of claim 10, wherein each of said mapping objects includes attributes selected from the group consisting of container identification number, container location, and container status.

12. The system of claim 1, wherein said sensor assembly includes one or more sensors which transmit a signal when said remote container is opened, wherein said at least one sensor is operatively coupled with said server.

13. The system of claim 12, wherein said sensor assembly further includes one or more sensors selected from the group consisting of a location sensor, a camera, a video sensor, a timer, and a transmitter, wherein said at least one sensor is operatively coupled with said server.

14. The system of claim 13, wherein said signal updates at least one attribute of a container object.

* * * * *